(12) United States Patent
Brantner et al.

(10) Patent No.: US 11,360,976 B2
(45) Date of Patent: Jun. 14, 2022

(54) DEPLOYMENT OF JAVASCRIPT AND TYPESCRIPT STORED PROCEDURES AND USER-DEFINED FUNCTIONS INTO DATABASE MANAGEMENT SYSTEMS

(71) Applicant: Oracle International Corporation, Redwood Shores, CA (US)

(72) Inventors: Matthias Brantner, Sunnyvale, CA (US); Laurent Daynes, Saint Ismier (FR); Pit Fender, Union City, CA (US); Benjamin Schlegel, Merced, CA (US); Anantha Kiran Kandukuri, Zürich (CH); Hassan Chafi, San Mateo, CA (US); Eric Sedlar, Pacific Palisades, CA (US); Juergen Christ, Waldshut (DE); Lucas Braun, Nuerensdorf (CH); Bastian Hossbach, Thalwil (CH); Alexander Ulrich, Freiburg (DE); Harshad Kasture, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 165 days.

(21) Appl. No.: 16/117,367

(22) Filed: Aug. 30, 2018

(65) Prior Publication Data
US 2019/0065552 A1 Feb. 28, 2019

Related U.S. Application Data

(60) Provisional application No. 62/552,909, filed on Aug. 31, 2017.

(51) Int. Cl.
*G06F 16/2453* (2019.01)
*G06F 16/2455* (2019.01)

(52) U.S. Cl.
CPC .. *G06F 16/24542* (2019.01); *G06F 16/24553* (2019.01)

(58) Field of Classification Search
CPC ......... G06F 16/24542; G06F 16/24553; G06F 16/2453; G06F 16/2471; G06F 16/24532
(Continued)

(56) References Cited

U.S. PATENT DOCUMENTS 5,794,030 A 8/1998 Morsi
7,168,063 B2 1/2007 Meijer
(Continued)

FOREIGN PATENT DOCUMENTS

CN 106156353 A 11/2016

OTHER PUBLICATIONS

Hossbach, U.S. Appl. No. 16/006,668, filed Jun. 12, 2018, Office Action, dated Jun. 26, 2019.
(Continued)

*Primary Examiner* — Hosain T Alam
*Assistant Examiner* — Nicholas E Allen
(74) *Attorney, Agent, or Firm* — Hickman Becker Bingham Ledesma LLP; Brian N. Miller

(57) ABSTRACT

Herein are computerized techniques for deploying JavaScript and TypeScript stored procedures and user-defined functions into a database management system (DBMS). In an embodiment, a computer generates a SQL call specification for each subroutine of one or more subroutines encoded in a scripting language. The generating is based on a signature declaration of the subroutine. Each subroutine comprises a definition of a stored procedure or a user-defined function. The computer packages the definition and the SQL call specification of each subroutine into a single bundle file. The definition and the SQL call specification of each subroutine are deployed into a DBMS from
(Continued)

the single bundle file. Eventually, the SQL call specification of at least one subroutine is invoked to execute the definition of the subroutine in the DBMS.

20 Claims, 5 Drawing Sheets

(58) Field of Classification Search
USPC ............................................................ 707/718
See application file for complete search history.

(56) References Cited

U.S. PATENT DOCUMENTS

| | | |
|---|---|---|
| 7,171,424 B2 | 1/2007 | Barsness |
| 7,275,241 B2 | 9/2007 | Choi |
| 7,287,033 B2 | 10/2007 | Shadmon |
| 8,457,419 B2 | 6/2013 | Lamb |
| 8,515,999 B2 | 8/2013 | De Cerqueira Gatti et al. |
| 8,639,743 B1 | 1/2014 | Colton |
| 8,700,579 B2 | 4/2014 | Apanowicz |
| 8,812,523 B2 | 8/2014 | Marwah |
| 8,880,990 B2 | 11/2014 | Masuko |
| 8,881,146 B2 | 11/2014 | Padmanabhuni |
| 8,887,127 B2 | 11/2014 | Lee |
| 9,021,455 B2 | 4/2015 | Chapman |
| 9,037,614 B1 | 5/2015 | Parrott |
| 9,110,970 B2 | 8/2015 | Mohan |
| 9,235,394 B2 | 1/2016 | Inglis |
| 9,307,614 B2 | 4/2016 | Parrott |
| 9,443,192 B1* | 9/2016 | Cosic .................. G06N 3/0427 |
| 9,497,136 B2 | 11/2016 | Ramarao |
| 9,558,214 B1 | 1/2017 | Parrott |
| 9,678,729 B2 | 6/2017 | Goetz |
| 9,760,350 B2 | 9/2017 | Lagergren |
| 9,766,926 B2 | 9/2017 | Bonetta |
| 10,262,001 B2 | 4/2019 | Faith |
| 2001/0056504 A1 | 12/2001 | Kuznetsov |
| 2005/0114848 A1 | 5/2005 | Choi |
| 2005/0198011 A1 | 9/2005 | Barsness |
| 2005/0273772 A1 | 12/2005 | Matsakis |
| 2007/0038662 A1 | 2/2007 | Bendel et al. |
| 2007/0220020 A1 | 9/2007 | Goto |
| 2008/0022267 A1 | 1/2008 | Johnson |
| 2008/0071818 A1 | 3/2008 | Apanowicz |
| 2008/0189679 A1* | 8/2008 | Rodriguez ................ G06F 8/34 717/105 |
| 2008/0253668 A1 | 10/2008 | Lamb |
| 2009/0007160 A1 | 1/2009 | Wei |
| 2009/0307239 A1 | 12/2009 | Chandrasekar |
| 2010/0306207 A1 | 12/2010 | Li |
| 2010/0333085 A1 | 12/2010 | Criddle |
| 2011/0264560 A1 | 10/2011 | Griffiths |
| 2012/0054725 A1 | 3/2012 | Inglis |
| 2012/0078860 A1 | 3/2012 | Roberts |
| 2012/0265726 A1* | 10/2012 | Padmanabhan ....... G06F 16/214 707/602 |
| 2012/0284288 A1 | 11/2012 | Bickle |
| 2013/0041980 A1* | 2/2013 | Wickman .............. G06Q 10/06 709/217 |
| 2013/0086569 A1 | 4/2013 | Chapman |
| 2013/0139151 A1 | 5/2013 | Criddle |
| 2013/0145254 A1 | 6/2013 | Masuko |
| 2013/0174132 A1 | 7/2013 | Fenicle |
| 2013/0205282 A1 | 8/2013 | Lafreniere |
| 2013/0263116 A1 | 10/2013 | Haupt et al. |
| 2013/0325904 A1 | 12/2013 | Clifford |
| 2014/0095517 A1 | 4/2014 | Marwah |
| 2015/0081988 A1 | 3/2015 | Bonetta |
| 2015/0142846 A1 | 5/2015 | Levine |
| 2015/0254068 A1 | 9/2015 | Bickle |
| 2015/0301807 A1 | 10/2015 | Goetz |
| 2015/0378694 A1 | 12/2015 | Lagergren |
| 2016/0087933 A1* | 3/2016 | Johnson ................ H04L 67/34 709/245 |
| 2016/0088023 A1* | 3/2016 | Handa .................. G06F 16/957 726/1 |
| 2016/0112531 A1* | 4/2016 | Milton .................. G06F 9/5083 709/205 |
| 2016/0267150 A1* | 9/2016 | Gubau i Forne .... G06Q 30/018 |
| 2016/0328442 A1* | 11/2016 | Waas ...................... G06F 16/252 |
| 2016/0328488 A1* | 11/2016 | Lytle ...................... G06F 16/252 |
| 2017/0046420 A1* | 2/2017 | Fuchs ........................ G06F 9/46 |
| 2017/0141791 A1 | 5/2017 | Balegar |
| 2017/0147310 A1* | 5/2017 | Bregler .................. G06F 16/21 |
| 2017/0161043 A1* | 6/2017 | Khazanchi .......... H04L 41/0246 |
| 2017/0199922 A1* | 7/2017 | Gardner .............. G06F 16/2379 |
| 2017/0293652 A1 | 10/2017 | Kevorkian |
| 2018/0046623 A1 | 2/2018 | Faith |
| 2018/0052692 A1 | 2/2018 | Leenhouwers |
| 2018/0165364 A1 | 6/2018 | Mehta |
| 2018/0246752 A1 | 8/2018 | Bonetta |
| 2019/0377589 A1 | 12/2019 | Hossbach |

OTHER PUBLICATIONS

L. P. Deutsch et al., "Efficient Implementation of the Smalltalk-80 System", In Proc. of POPL, dated 1984, 6 pages.
A. V. Aho et al., "Compilers: Principles, Techniques, and Tools", Addison-Wesley Longman Publishing Co., Inc., Boston, MA, USA, dated 1986, 1038 pages.
A. Wob et al., "An Object Storage Model for the Truffle Language Implementation Framework", In Proc. of PPPJ, pp. 133{144. ACM, dated 2014, 12 pages.
D. Simon et al., "Snippets: Taking the High Road to a Low Level", ACM TECO,, dated Jun. 2015, 25 pages.
F. Farfan et al., "Beyond Lazy XML Parsing", In Proc. of DEXA, dated 2007, 10 pages.
F. Pezoa et al., "Foundations of JSON Schema", In Proc. of WWW, dated 2016, 11 pages.
A. Marian et al., "Projecting XML Documents", In Proc. of VLDB, dated 2003, 12 pages.
K. Czarnecki et al., "Generative Programming and Active Libraries", In International Seminar on Generic Programming, London, UK, dated 2000. Springer, 15 pages.
Zaharia et al., Apache Spark: A United Engine for Big Data Processing. Commun. ACM, dated Oct. 2016, 10 pages.
L. Stadler et al., "Optimizing R Language Execution Via Aggressive Speculation", In Proc. of DLS, dated 2016, 12 pages.
M. L. Noga et al., "Lazy XML Processing", In Proc. of DocEng, dated 2002, 8 pages.
S. Newman. "Building Microservices". O'Reilly Media, Inc., 1st edition, dated 2015, dated 473 pages.
T. Wurthinger et al., "One Vm to Rule them All", In Proc. of ONWARD, dated 2013, 18 pages.
U. Hoolzle et al., "Optimizing Dynamically-typed Object-oriented Languages with Polymorphic Inline Caches", In Proc. of ECOOP, dated 1991, 18 pages.
Y. Futamura. "Partial evaluation of computation Process & Mdash", anapproach to a compiler-compiler. Higher Order Symbol Computer, dated Dec. 1999, 11 pages.
l. Alagiannis et al.," NoDB in Action: Adaptive Query Processing on Raw Data", Proc. VLDB Endow, dated Aug. 2012, 4 pages.
Bonetta, U.S. Appl. No. 15/864,863, filed Jan. 8, 2018, Notice of Allowance, dated Apr. 26, 2019.
Karpathiotakis, M. et al., "Adaptive Query Processing on RAW Data", Proceedings of the VLDB Endowment, Dated Aug. 2014, pp. 1119-1130.
Slee et al., "Thrift: Scalable Cross-Language Services Implementation", Facebook, dated Apr. 1, 2007, 8 pages.
Raasveldt et al., "Don't Hold My Data Hostage: A Case For Client Protocol Redesign", Proc. VLDB Endow, dated Jun. 2017, 12 pages.
Li et al., "Mison: A Fast JSON Parser for Data Analytics", Proc VLDB Endow, dated Jun. 2017, 12 pages.
Daloze et al., "Efficient and Thread-Safe Objects for Dynamically-Typed Languages", ACM SIGPLAN Notices, vol. 51, No. 10 ACM, dated 2016, 19 pages.

(56) References Cited

OTHER PUBLICATIONS

Bonetta et al., "FAD.js: Fast JSON Data Access Using JITbased Speculative Optimizations", Proc VLDB Endow, dated Aug. 2017, 12 pages.
Andreas et al., "Trace-Based Just in Time Tyoe Soecialization for Dynamic Languages", ACM Sigplan Notices. vol. 44, No. 6, ACM, 2009, 14 pages.
Hossbach, U.S. Appl. No. 16/006,668, filed Jun. 12, 2018, Final Office Action, dated Dec. 17, 2019.
Hossbach, U.S. Appl. No. 16/006,668, filed Jun. 12, 2018, Notice of Allowance, dated Feb. 27, 2020.
Wimmer, Christian, Oracle, "One VM to Rule Them All", VM Research Group, Oracle Labs, dated 2016, 130 pages.
Github, "Writing a Language in Truffle. Part 1: A Simple, Slow Interpreter", dated Oct. 13, 2014, 17 pages.
Franklin, Christopher, "A Guide to Java 9 Modularity", https://www.baeldung.com/java-9-modularity, dated May 12, 2019, 14 pages.
Fehrenbach, Stefan, "Just-in-time Compilation for Generalized Parsing", dated Sep. 1, 2014, 41 pages.
Jammeh, Mohammed, "Linking PHP to JSON", dated Nov. 2, 2016, Treehouse Community, https://teamtreehouse.com/community/linking-php-to-json, 2 pages.

* cited by examiner

DEPLOYMENT OF JAVASCRIPT AND TYPESCRIPT STORED PROCEDURES AND USER-DEFINED FUNCTIONS INTO DATABASE MANAGEMENT SYSTEMS

RELATED APPLICATION AND CLAIM OF PRIORITY

This application claims the benefit of Provisional Application No. 62/552,909, filed Aug. 31, 2017, titled "Deployment Of Javascript And Typescript Stored Procedures And User-Defined Functions Into Database Management Systems", the entire contents of which is hereby incorporated by reference as if fully set forth herein, under 35 U.S.C. § 119(e). The applicant(s) hereby rescind any disclaimer of claim scope in the parent application or the prosecution history thereof and advise the USPTO that the claims in this application may be broader than any claim in the parent application.

FIELD OF THE INVENTION

The present invention relates to user defined logic within a relational database. Herein are techniques for generating and deploying structured query language (SQL) call specifications from typed declarations of procedures and functions declarations.

BACKGROUND

Stored procedures and user-defined functions provide a way to centralize business logic involving multiple structured query language (SQL) statements and running them inside a database management system (DBMS). They are typically executed inside the address space of the database. Doing so helps avoid expensive network round trips and saves time and memory by having direct access to the data that is being processed.

Various database management systems allow users to implement stored procedures in a variety of stored procedure languages such as Oracle's PL/SQL or Microsoft's Transact-SQL. Those languages provide syntax for statements to declare and define procedures.

For example, Oracle allows for creating a function using Oracle's proprietary PL/SQL language as follows:

```
'''SQL
CREATE OR REPLACE PROCEDURE DO_SOMETHING(ARG_1
TYPE_1, ..., ARG_N TYPE_N) BEGIN
// body of the function in PL/SQL END;
'''
```

Allowing users to provide stored procedures in languages such as PL/SQL has some disadvantages:
Such languages are typically vendor-specific;
Developers for specialized stored procedure languages are scarce;
Stored procedures are stored in the database and often harder to keep track of within modern version control systems (VCS);
Stored procedures are typically not considered modern programming languages; and
Tool support is often lacking behind that of other programming languages.

In order to remedy this situation, some DBMSs allow for providing stored procedures in other languages such as Python (e.g. Amazon RedShift), Java (e.g. Oracle) or Azure DocumentDB (JavaScript). As an example, Oracle allows for creating Java functions and stored procedures:

```
'''SQL
CREATE OR REPLACE AND COMPILE JAVA SOURCE NAMED
DO_SOMETHING_JAVA AS
public class DoSomething
{
  public static String do( ) { return "HelloWorld"; }
};
CREATE OR REPLACE FUNCTION DO_SOMETHING RETURN
VARCHAR2 AS LANGUAGE JAVA
NAME 'DoSomething.do( ) return java.lang.String';
'''
```

Implementing stored procedures in more modern or widespread languages such as Java avoids vendor lock-in and makes it easier to find developers. However, problems remain:
The source code is still stored in the database which makes it hard to keep track of within VCSs;
Having to include the source code literally within a PL/SQL function declarations does not allow for implementing large-scale procedures that leverage libraries or packages available in that language;
Developers still need to know and understand PL/SQL for creating the function declaration; and
Developers cannot use the tools that are typically used for developing in that language.

In order to solve some of these problems, the Oracle Database as well as other DBMSs provide tools (e.g. loadjava) that load arbitrary Java classes or JAR files from files into the database schema. With those tools:
The Java source code can be managed inside a version control system (VCS);
Java libraries can be used and large-scale procedures can be implemented; and
Developers can leverage the development tools of their choice outside of the DBMS.

For example:

```
'''bash
loadjava -u scott -schema test myjar.jar
'''
'''SQL
CREATE PROCEDURE DO_SOMETHING RETURN VARCHAR2 AS LANGUAGE JAVA
NAME 'DoSomething.do( ) return java.lang.String';
'''
```

However, developers still need to know much PL/SQL in order to create the required call specifications. Furthermore, Java classes loaded into the database through JAR files might contain conflicting Java classes. For example, the JAR files 'myjar.jar' and 'yourjar.jar' might both include the same external library but in incompatible versions. Particularly, call specifications for table functions and aggregation functions have been hard to create in the past using languages like PL/SQL, which led to developers avoiding creation of such functions altogether.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
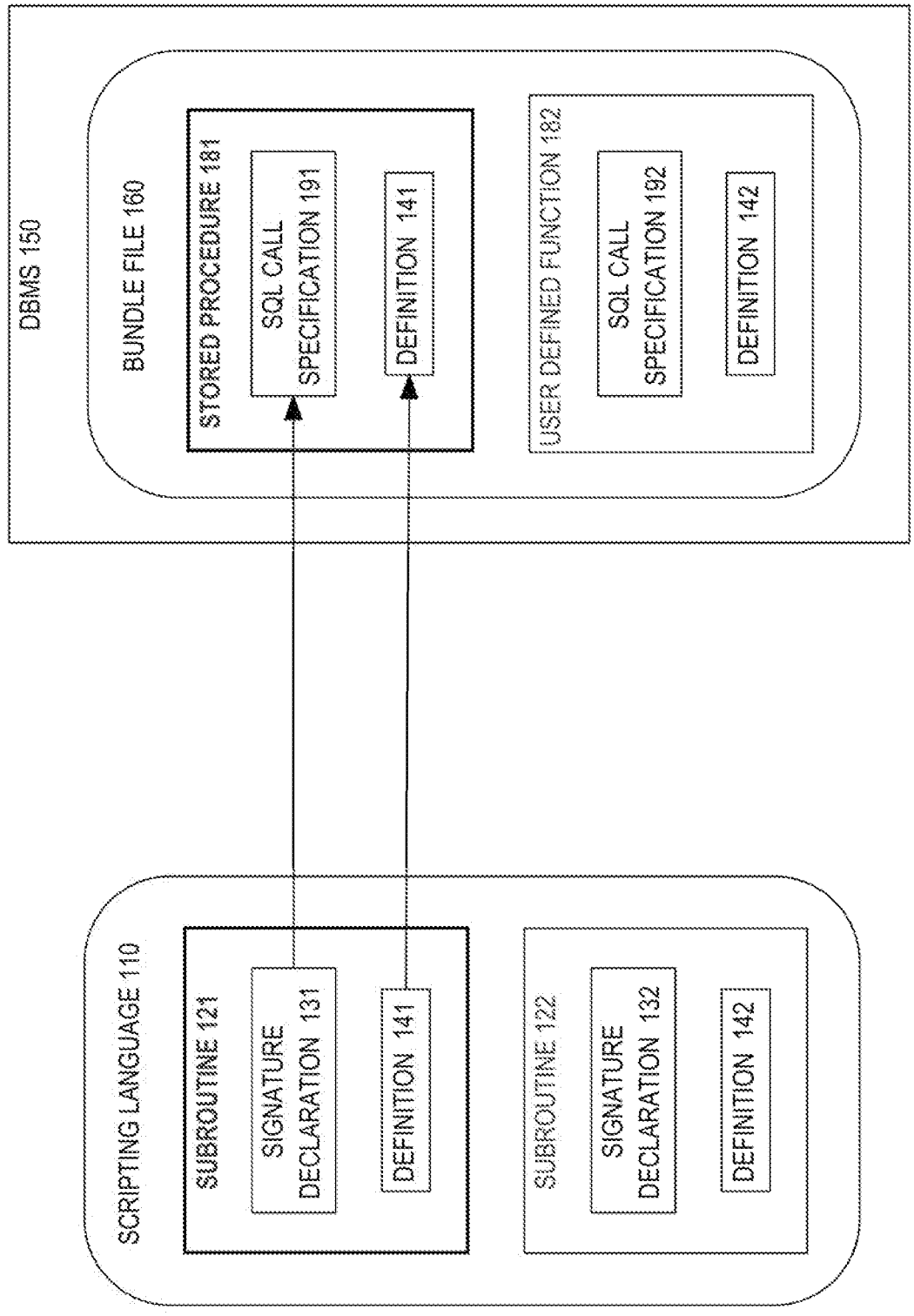
FIG. 1 is a block diagram that depicts an example computer that generates and deploys SQL call specifications into a DBMS.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Herein are computerized techniques for deploying JavaScript and TypeScript stored procedures and user-defined functions into a database management system (DBMS). The techniques include bundling multiple JavaScript modules into a single bundle and automatically generating SQL call specifications from typed procedure and function declarations.

Bundling JavaScript source code into atomic units avoids conflicts if multiple procedures leverage the same library in conflicting versions. Bundling also allows for reuse of a huge number of NPM packages provided by the community. Additionally, large-scale applications and stored procedures can be implemented using the various JavaScript modules systems while still deploying a single atomic bundle. This avoids management of complex dependencies inside the database. Particularly, this simplifies user and system updating, which typically have been hard to manage in the past.

Additionally, by deriving call specifications from the signatures of TypeScript procedures, developers need not learn database languages such as PL/SQL. Deriving call specifications avoids redundancy which helps prevent errors that might occur as a JavaScript/TypeScript function evolves when the PL/SQL declaration is not updated. Call specifications are automatically derived for:
- stored procedures,
- user-defined scalar functions,
- table functions, and
- aggregation functions.

Compared to existing approaches, the techniques for deploying stored procedures leverages the ecosystem of the stored procedure language. Specifically, stored procedures:
- can be implemented using the tools (in particular IDEs) that are typically used by JavaScript developers,
- can reuse the huge number of existing JavaScript packages,
- can be developed without knowing other database languages such as PL/SQL,
- the source code of the stored procedure can be managed using modern version control systems (VCS), and
- popular continuous integration tools (e.g. gulp or grunt) can be used for deploying JavaScript into a DBMS.

All of the above points address commonly known disadvantages of traditional stored procedures. Improving on this dramatically increases developer productivity which decreases the cost of developing and maintaining stored procedures. Deploying JavaScript stored procedures into an DBMS comprises two key steps: a) bundling of JavaScript source code, and b) deriving PL/SQL call specification.

In an embodiment, a computer generates a SQL call specification for each subroutine of one or more subroutines encoded in a scripting language. The generating is based on a signature declaration of the subroutine. Each subroutine comprises a definition of a stored procedure or a user-defined function. The computer packages the definition and the SQL call specification of each subroutine into a single bundle file. The definition and the SQL call specification of each subroutine are deployed into a DBMS from the single bundle file. Eventually, the SQL call specification of at least one subroutine is invoked to execute the definition of the subroutine in the DBMS.

1.0 EXAMPLE COMPUTER

FIG. 1 is a block diagram that depicts an example computer 100, in an embodiment. Computer 100 generates and deploys SQL call specifications into a DBMS. Computer 100 may be one or more of a rack server such as a blade, a personal computer, a mainframe, or other computing device.

Computer 100 hosts polyglot DBMS 150, which means that DBMS 150, in addition to processing SQL, can process logic encoded in scripting language 110, such as JavaScript, TypeScript, or CoffeeScript. For example, subroutines 121-122 may be JavaScript functions.

Each of subroutines 121-122 is bipartite, which includes a signature and a definition. For example, subroutine 121 is defined by definition 141 that contains a complete JavaScript function definition. A JavaScript function definition has an impoverished function signature that naturally lacks type information for parameters and returned result of subroutine 121. However, type information is available in a separate signature declaration for each subroutine. For example, subroutine 121 is defined by definition 141 with type information provided by signature declaration 131. Signature declarations 121-32 are expressed in TypeScript that may accompany a JavaScript function, such as in a same or separate JavaScript file. Example JavaScript function definitions and TypeScript signatures are provided and discussed later herein.

Various approaches are used for developing large-scale JavaScript applications. For example, applications can be implemented using language dialects and extensions such as TypeScript, BabelJS or CoffeeScript. The goal of those tools is to improve the developer experience by providing a syntax that is easier to write or adding features such as static typing. Such tools are compilers or transpilers which compile or transpile into plain JavaScript source code, respectively.

The deployment techniques taught herein may leverage those tools. Stored procedures can be written in such dialects and extensions. During the deployment process, the input source code is converted to JavaScript which can then be executed as stored procedure inside a DBMS.

Developers leverage JavaScript module systems such as AMD, CommonJS or ES Harmony. Module systems generally decompose large JavaScript code bases into smaller modules mostly to achieve what is called loose coupling. Smaller modules are easier to maintain, develop, test, share, and reuse. The JavaScript community has tools such as Browserify or Webpack which can be used to bundle multiple JavaScript modules into a single JavaScript module. This workflow is typically used for deploying JavaScript applications into web applications that can be ran in Browsers.

In operation, computer 100 transpiles (i.e. cross compiles) each JavaScript subroutine into a format that can be directly loaded into DBMS 150 for storage and eventual invocation. For example, subroutine 121 is transpiled into stored procedure 181, and subroutine 122 is transpiled into user defined function (UDF) 182. Whether a JavaScript subroutine is transpiled into a stored procedure or UDF depends on whether or not the subroutine returns a result. Transpiling generates a UDF if the subroutine returns a result. Otherwise a stored procedure is generated.

Generated routines 181-182 are bipartite. Each contains a definition and an SQL call specification. For example, subroutine 121 is transpiled into stored procedure 181 that comprises SQL call specification 191 and definition 141. Typically the generated definition is a direct copy of the original function definition, which is why definition 141 is shown in both of scripting language 110 and bundle file 160. Generation of SQL call specifications may be more complicated and are discussed later herein.

Transpiling generates the contents of bundle file 160, which may be a JavaScript file. Transpiling may process multiple JavaScript files and may generate multiple JavaScript files that can by packaged into bundle file 160 that is a single monolithic JavaScript file. For example, computer 100 may receive a command (not shown) to process subroutines 121-122. The command may list the names of subroutines 121-122 and paths to JavaScript file(s) that contain subroutines 121-122. Based on that command, computer 100 generates bundle file 160, which may be a monolithic JavaScript file. In an embodiment, an open source JavaScript packaging tool such as Browserify or Webpack generates bundle file 160.

DBMS 150 may load routines 181-182 by loading bundle file 160. After loading, routines 181-182 may be invoked by DBMS 150, such as while executing an data manipulation language (DML) statement such as an ad hoc query. Transpiling, bundling, and deployment are discussed later herein.

2.0 EXAMPLE BUILD PROCESS

Figure 2:
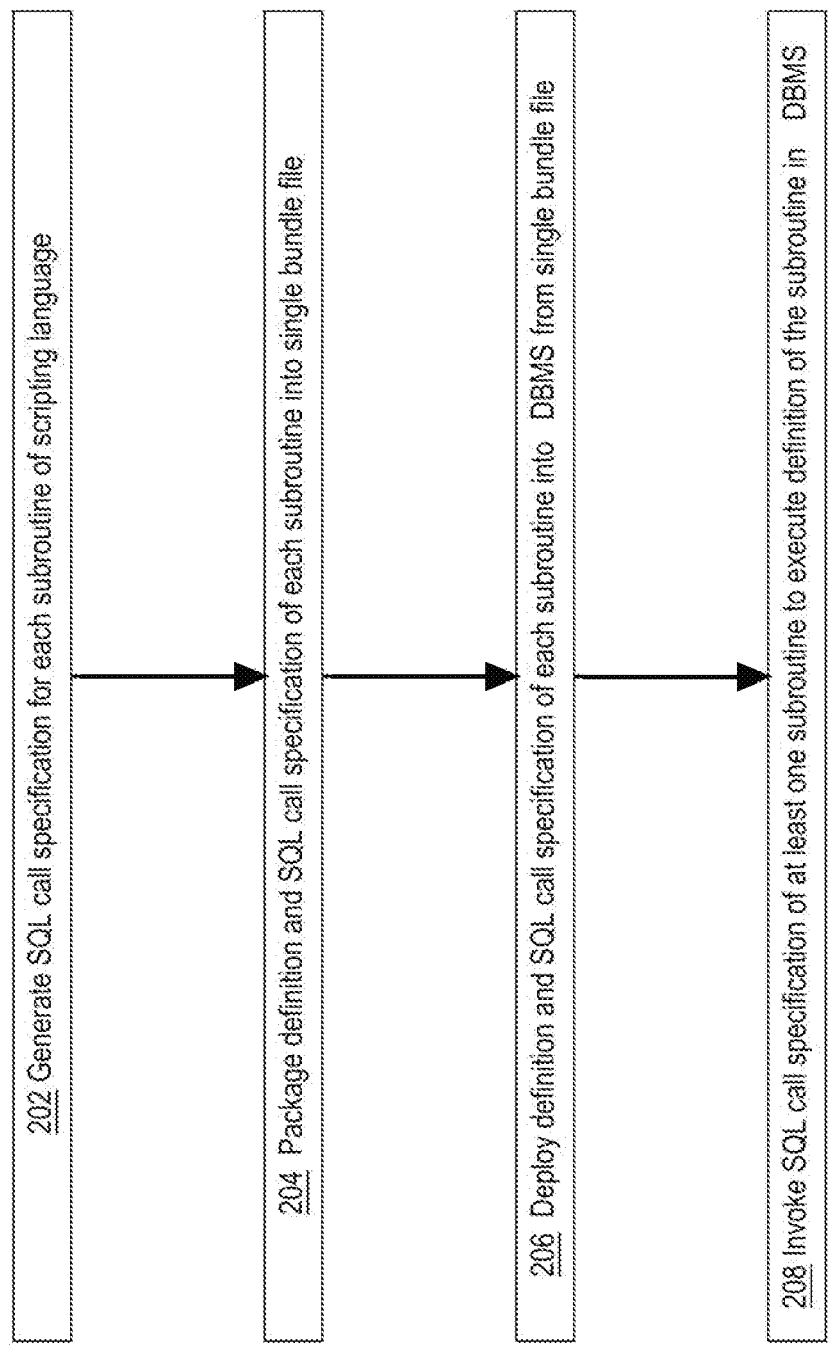
FIG. 2 is a flow diagram that depicts an example computer process for generating and deploying SQL call specifications into a DBMS.

FIG. 2 is a flow diagram that depicts computer 100 generating and deploying SQL call specifications into a DBMS, in an embodiment. FIG. 2 is discussed with reference to FIG. 1.

Transpiling occurs during step 202 that generates an SQL call specification for each subroutine of scripting language that has a signature declaration, such as a TypeScript "extern" statement, as explained later herein. For example, SQL call specification 191 is generated from signature declaration 131 for subroutine 121. SQL call specification generation is discussed later herein. Subroutines that lack a signature declaration, such as helper functions (not shown), may be merely copied by step 202. Indeed, all function definitions, including 141-142 should be copied more or less as is during transpiling. Step 202 may emit generated and copied artifacts into various text files to await further processing. Although JavaScript logic is merely copied during step 202, some TypeScript logic may be subject to transpiling into JavaScript when copied.

Step 204 packages the definition and SQL call specification of each subroutine into a single bundle file. For example, Browserify may perform such bundling. Copied helper functions are included in the bundling. In this example, SQL call specifications 191-192 and definitions 141-142 of routines 181-182 are concatenated in a single bundle file 160.

Step 206 deploys the definition and SQL call specification of each subroutine into the DBMS from single bundle file. For example, a DDL script may cause DBMS 150 to load the contents of bundle file 160 and analyze and store the contents as stored procedures and UDFs, such as 181-182. After step 206, the DBMS is ready for use.

Steps 202, 204, and 206 may occur in response to a command directly to DBMS 150 or to a tool that connects to DBMS 150. One, some, or all of steps 202, 204, 206 may occur by a same command or separate commands more or less in sequence. Example commands are discussed later herein.

Step 208 may invoke an SQL call specification of at least one subroutine to execute a definition of the subroutine in the DBMS. For example, an ad hoc query may invoke one or both of routines 181-182. Routines 181-182 remain loaded until expressly unloaded or replaced and may be invoked repeatedly. Example queries are discussed later herein.

3.0 EXAMPLE PROCESS PIPELINE

Figure 3:
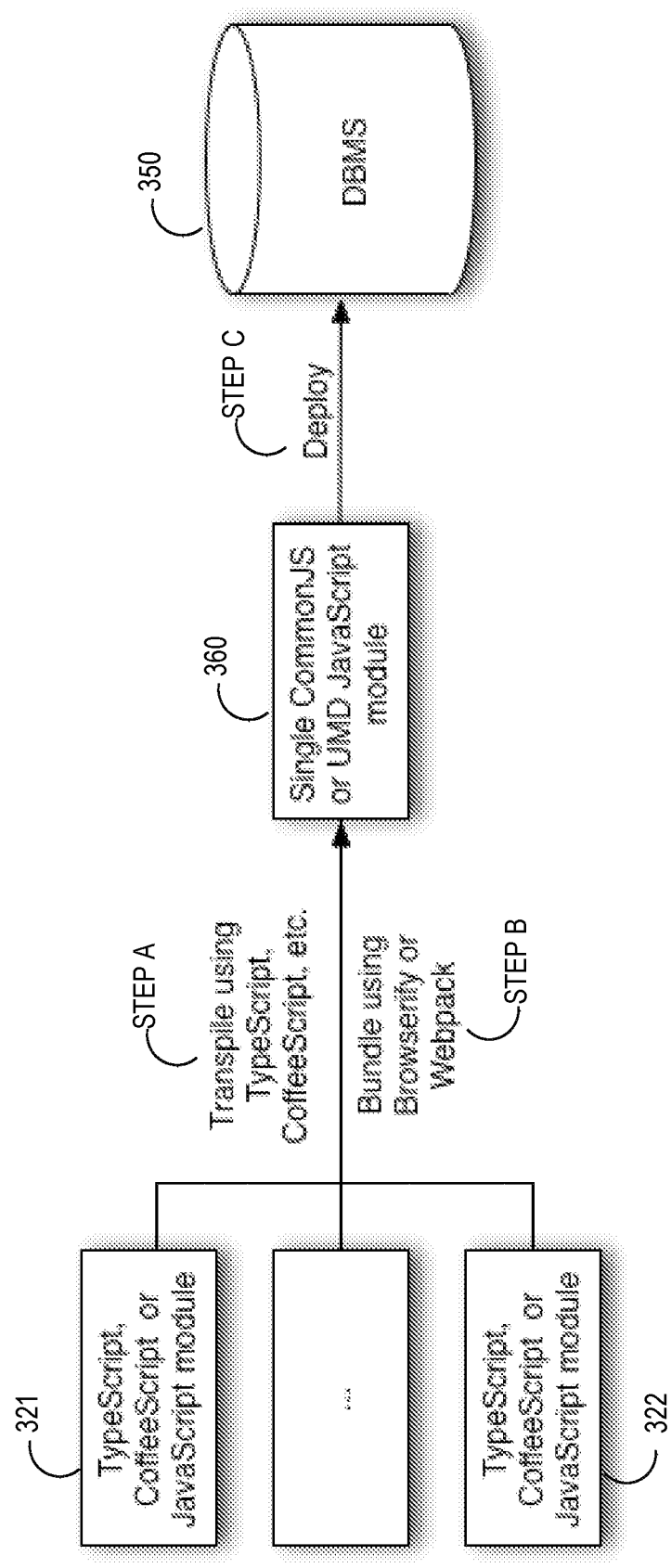
FIG. 3 is a block diagram that depicts an example computer that has a build pipeline that includes transpiling and deployment.

FIG. 3 is a block diagram that depicts an example computer 300, in an embodiment. Computer 300 has a build pipeline that includes transpiling and deployment. Computer 300 may be an implementation of computer 100. Computer 300 contains DBMS 350. FIG. 3 shows a build processing pipeline having sequential steps A-C.

3.1 BUNDLING

For ease of discussion, step B is explained here first, even though step A occurs first in operation. Bundling from JavaScript source code occurs as follows. During step B, building techniques herein may leverage tools such as Browserify in order to bundle large-scale JavaScript applications spread across modules, such as 321-322, into a single module 360 that can be atomically deployed into DBMS 350. JavaScript modules 321-322 typically export an application programming interface (API) that consists of a set of variables and functions. For example, CommonJS modules export functions as follows:

```
module.export.doSomething = function(input) {
// body of the function
};
```

In this example, a function is exported using the name 'doSomething'. Exporting makes designated functions available for transpiling, instead of mere copying as with helper functions.

Building techniques herein allow developers to deploy JavaScript modules 321-322 in the CommonJS or Universal Module Definition (UMD) pattern. Each of the exported functions or variables can be loaded by DBMS 350 and executed as stored procedure or UDF. The process is shown as a pipeline having steps A-C.

3.2 DERIVING PL/SQL CALL SPECIFICATION

PL/SQL call specifications are derived as follows during step A, which is transpiling. JavaScript is a dynamically typed language. Database languages such as SQL or PL/SQL are typically statically typed. Furthermore, JavaScript and DBMS 350 typically do not share a same type system. In order to execute stored procedures and call UDFs from SQL, database types for parameters and return values have to be provided for each exported function. In the database, call specifications are needed to declare those stored procedures and UDFs.

Extensions to JavaScript such as TypeScript or BabelJS with Flow allow developers to provide types for functions and variables. Deployment techniques herein leverage such extensions to provide type information to DBMS 350. Specifically, a deployment tool transpiles TypeScript function declarations into corresponding database call specifications. Such declarations can either be provided as part of TypeScript declaration files or are directly available if the stored procedure is implemented in TypeScript itself. As an example, consider the JavaScript CommonJS-style module shown above. Also consider the following TypeScript declaration file 'mystoredproc.d.ts' which provides the type declaration for the 'doSomething' function.

```
"'JavaScript
export function doSomething(input: number);
"'
```

In this example, 'doSomething' declares a stored procedure that takes an input parameter typed as JavaScript number. During the deployment process, this declaration will be automatically transpiled into a database call specification:

```
"'SQL
CREATE OR REPLACE PROCEDURE doSomething(a NUMBER) AS
LANGUAGE JS
name 'mystoredproc.doSomething(a number)';
-- another example where Database types have a different name
from typescript types:
CREATE OR REPLACE PROCEDURE doSomething(a VARCHAR) AS
LANGUAGE JS
name 'mystoredproc.doSomething(a string)';
"'
```

This tells DBMS 350 that:

A stored procedure named 'doSomething' is declared because the function does not return a value;

The type for the first and only parameter is a database 'NUMBER';

The stored procedure can be found in a library 'mystoredproc'; and

The typescript type number is used here that is interpreted as the internal JavaScript type is 'DOUBLE', which corresponds to JavaScript's IEEE754 number representation.

Similarly, the TypeScript declaration . . .

```
"'JavaScript
export function doSomething(input: number) : number;
"'
``` is transpiled into a function instead of a stored procedure . . .

```
"'SQL
CREATE OR REPLACE FUNCTION doSomething(a NUMBER) RETURN NUMBER
AS LANGUAGE JS
Name 'mystoredproc.doSomething(a number) return number;
"'
``` because the TypeScript declaration declared a return type.

3.3 RENAMING

Exported functions may be renamed as follows. If the developer wants to name the JavaScript function differently in the database, a TypeScript export statement can be used:

```
"'JavaScript
export function doSomething(input: number): number;
export { doSomething as doSomethingElse };
"'
```

The transpiler would create the following call specification for this:

```
'''SQL
CREATE OR REPLACE FUNCTION doSomethingElse(a NUMBER) RETURN
NUMBER
AS LANGUAGE JS
NAME 'mystoredproc.doSomething(a number) return number';
'''
```

3.4 IMPLICIT AND EXPLICIT TYPE MAPPINGS

Data types of parameters and return values may need dynamic (i.e. runtime) conversion. Type conversion may occur according to a static (i.e. build time) mapping as follows. To simplify the conversion process, the transpilation tool may use an implicit mapping between JavaScript/TypeScript types and database types. The following table depicts the implicit mapping between JavaScript types and database types:

| JavaScript Type | Database Type |
| --- | --- |
| String | VARCHAR2 |
| Number | NUMBER |
| boolean | NUMBER |

If the developer wants to explicitly influence the mapping, she can use JSDoc annotations to overwrite the implicit mapping as follows.

```
'''JavaScript
/**
 * @oracle( { parameter : "input", sqlType : "BINARY_DOUBLE" } )
 */
export function doSomething(input: number);
'''
```

This '@oracle' annotation in the TypeScript declaration tells the transpiler that the 'input' parameter is of the Oracle database type 'BINARY_DOUBLE' instead of the 'NUMBER' type that would result out of the implicit mapping. Similarly, the annotation can also be used for changing the default mapping of the returned type to 'BINARY_DOUBLE' as follows.

```
'''JavaScript
/**
 * @oracle( { returnType : "BINARY_DOUBLE" } )
 */
export function doSomething(input: number): number;
'''
```

3.5 OUT PARAMETERS

Output parameters are transpiled as follows. In PL/SQL the concept of IN, IN OUT and OUT parameters exists. This concept cannot be mapped easily to the call-by-value concept of JavaScript. This mismatch is bridged by declaring the returned type as object. The object stores the OUT parameters. If OUT parameters are used, the JavaScript function will be transpiled to a PL/SQL stored procedure call declaration according to the following rules and example:

If there is a primitive return type the JavaScript function is published as a scalar function.

If there is a complex return type in form of an object the JavaScript function is published as a stored procedure with OUT parameters.

```
'''JavaScript
export interface FuncNameResult { inOutPar: number,
outPar: number
}
export function doSomething(inPar: number, inOutPar: number) :
FuncNameResult;
'''
```

This transpiles into:

```
'''SQL
CREATE OR REPLACE PROCEDURE doSomething(a NUMBER, b IN OUT
NUMBER, c OUT NUMBER) AS LANGUAGE JS
LIBRARY mystoredproc;
NAME " mystoredproc.doSomething(a number, b number, C number);
'''
```

Since 'inOutPar' is a parameter to the TypeScript function and a member of the 'FuncNameResult' interface, the transpiler infers that this is an 'IN' as well as an 'OUT' parameter.

3.6 AGGREGATION FUNCTIONS

A UDF may be an aggregation function that operates over value(s) of multiple rows during a single invocation, such as the SQL built-in function MAX does. Aggregation functions are transpiled as follows. The TypeScript declaration of an aggregation function needs to declare that return type as oracle.Aggregation parametrized with two types: one for the aggregation's input type and one for the result type of the aggregation.

```
'''JavaScript
import * as oracle from "dbjs-oracle";
export function secondMax( ) : oracle.Aggregation<number,
number>;
'''
```

This tells the Oracle Database that: 1) the function is an aggregation function, 2) its input type is a number (first type parameter), and 3) its result is also a number (second type parameter). The transpiled PL/SQL declaration is as follows:

```
'''SQL
CREATE OR REPLACE TYPE SECOND_MAX_JS_TY AS OBJECT (
identifier RAW(8),
STATIC FUNCTION ODCIAggregateInitialize (ctx IN OUT
SECOND_MAX_JS_TY) RETURN NUMBER
AS LANGUAGE JS Name 'aggregation.secondMax(ctx long)',
MEMBER FUNCTION ODCIAggregateIterate
(self IN OUT SECOND_MAX_JS_TY,value IN NUMBER) RETURN NUMBER
AS LANGUAGE JS NAME 'aggregation.ODCIAGGREGATEITERATE(self long,
value number)',
MEMBER FUNCTION ODCIAggregateTerminate
(self IN OUT SECOND_MAX_JS_TY, returnValue OUT NUMBER , flags IN
NUMBER) RETURN NUMBER
AS LANGUAGE JS NAME 'aggregation.ODCIAGGREGATETERMINaTE(self
long, returnValue number, flags number)',
MEMBER FUNCTION ODCIAggregateMerge
(self IN OUT SECOND_MAX_JS_TY, ctx IN OUT SECOND_MAX_JS_TY)
RETURN NUMBER
AS LANGUAGE JS NAME 'aggregation.ODCIAGGREGATETERMINATE(self
long, ctx long)';
MEMBER FUNCTION ODCIAggregateDelete
(self IN OUT SECOND_MAX_JS_TY, ctx IN OUT SECOND_MAX_JS_TY)
RETURN NUMBER
AS LANGUAGE JS NAME 'aggregation.delete(self long, ctx long)';
CREATE OR REPLACE FUNCTION SECOND_MAX_JS (value IN NUMBER)
RETURN NUMBER AGGREGATE
USING SECOND_MAX_JS_TY;
'''
```

Renaming and overwriting the explicit mapping works as described above.

3.7 TABLE FUNCTIONS

As follows, the declaration of table functions is declared similarly to aggregation functions.

```
'''JavaScript
import * as oracle from "dbjs-oracle";
export function fib( ) : oracle.Table<number>;
'''
```

The TypeScript declaration needs to declare that return type as oracle. Table parameterized with the result type. The result of the transpilation is similar to aggregation functions.

3.8 TYPESCRIPT

The official TypeScript compiler provides an API that developers can leverage. Specifically, build techniques herein use the API to parse TypeScript declarations into an abstract syntax tree (AST). In case of an invalid input, the TypeScript compiler raises an appropriate error. The AST is then traversed and the corresponding PL/SQL call specifications are created. TypeScript concepts that are not relevant for the transpilation process are ignored.

4.0 DBJS

The following is a discussion of example tooling, including example database JavaScript (DBJS) tool. With DBJS, a developer can write JavaScript code in a same way the developer would for Node.j s. Specifically, the developer can split custom code into modules or NPM packages and use the Node.js require function to import functionality that is exported by other modules or packages. DBJS uses open source Browserify, to combine all dependencies into a single bundle file that will be sent to a database. Functions exported in the top-level/main package can be made available to the database as stored procedures or UDFs. The name of the JavaScript bundle/module that is deployed, is derived from the bundle file name and always ends with '.js'.

DBJS uses a Browserify open source plugin "tsify" in order to compile TypeScript and bundle resulting JavaScript modules such that they can be deployed into a database. For example, the following may be content of a TypeScript file 'helloworld.ts'.

```
'''TypeScript
export function helloworld( ) : string {
  return 'HelloWorld';
}
'''
```

The following command will automatically compile TypeScript into JavaScript and send the resulting file to the database.

```
'''bash
$ db.js deploy -u scott -p tiger -c localhost:1521/DBML
helloworld.ts
'''
```

4.1 CALL SPECIFICATIONS

If a stored procedure or UDF is implemented in TypeScript, DBJS will automatically derive the PL/SQL call specification from the signature of the TypeScript function. For example, in the 'helloworld.ts' TypeScript example above, the call specification is automatically derived. Optionally, a user may provide a separate TypeScript declaration file that contains custom call specifications.

4.2 CALLOUTS

SQL can be executed from a JavaScript stored procedure or UDF. The following describes a SQL driver that is built into Oracle Database Multilingual, a polyglot relational DBMS. In order to use the driver, it needs to be imported using the 'dbRequire' function.

```
'''JavaScript
    var sql = require('@oracle/sql');
'''
```

Executing a SQL query and iterating over the resulting rows occurs as follows, such that rows are iterated, and columns are numbered.

```
'''JavaScript
    for (var row of sql.execute("SELECT EMPNO, ENAME FROM EMP") .rows) {
        var empno = row[0];
        var ename = row[1];
        ...
    }
'''
```

By default, each row is represented as a regular JavaScript array of attribute values. The following query returns rows with two attributes that are represented as arrays with two elements.

```
'''JavaScript
    [7369, "SMITH"]
    [7499, "ALLEN"]
    ...
'''
```

5.0 HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
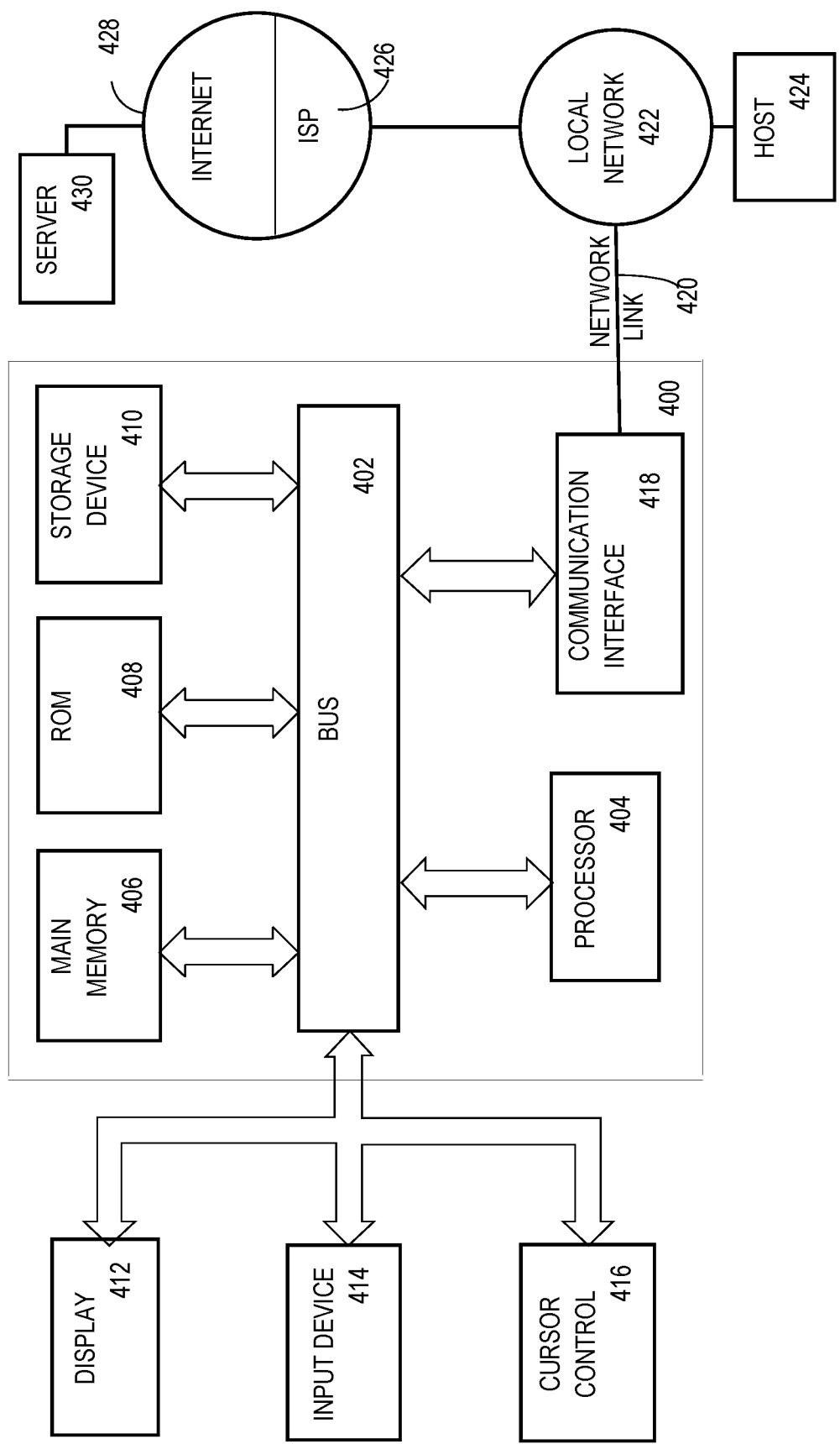
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6.0 SOFTWARE OVERVIEW

Figure 5:
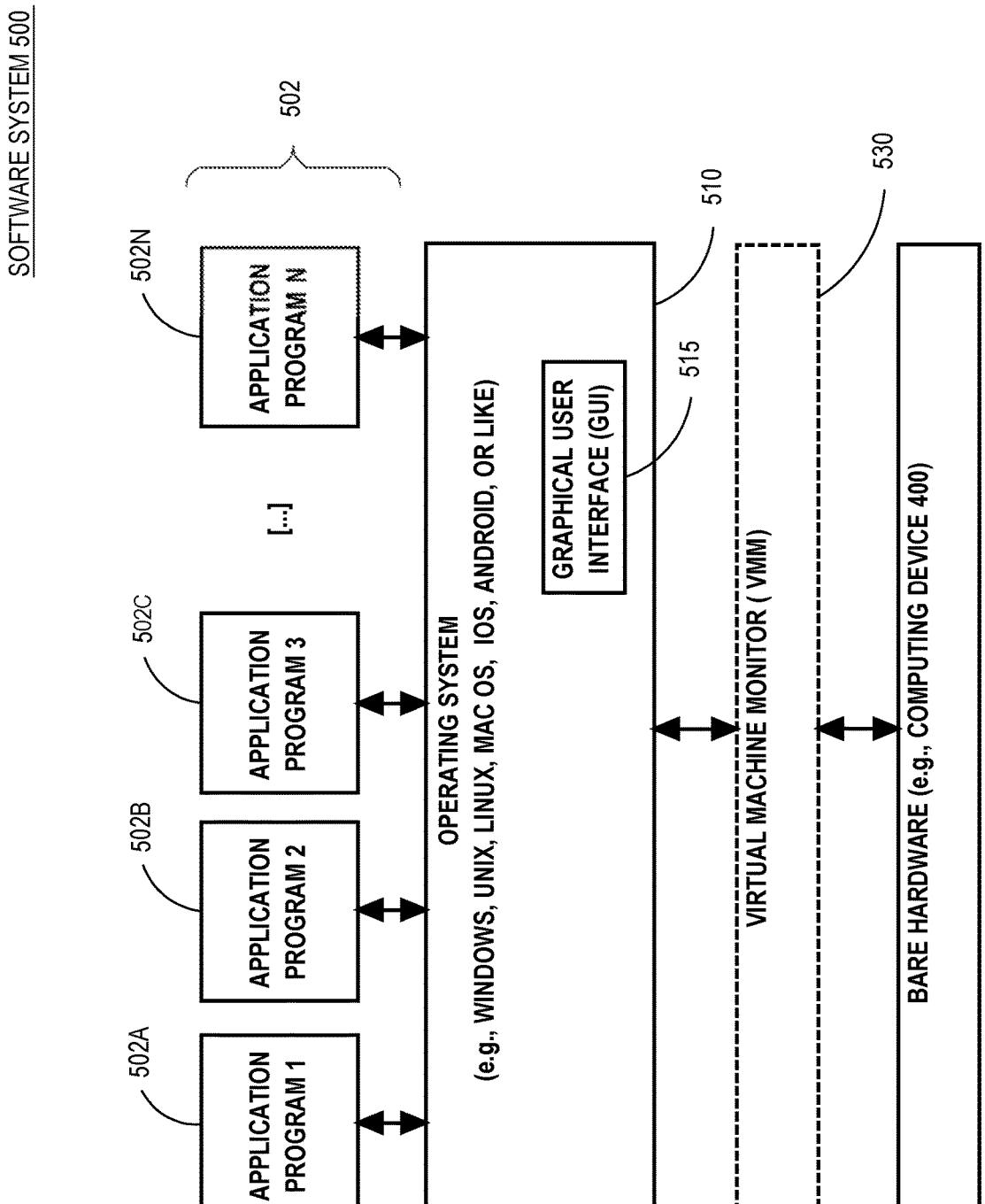
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 500 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

7.0 CLOUD COMPUTING

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8.0 DATABASE OVERVIEW

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

What is claimed is:

1. A method comprising:
generating a structured query language (SQL) call specification for each subroutine of one or more subroutines encoded in a scripting language, including a particular SQL call specification for a particular subroutine of the one or more subroutines, wherein:
said generating is based on a signature declaration of the subroutine,
each subroutine of the one or more subroutines comprises a definition of one selected from the group consisting of: a stored procedure and a user-defined function,
said particular subroutine returns a structure that contains a plurality of fields, and
said particular SQL call specification contains each field of the plurality of fields as a respective parameter;
packaging the definition and the SQL call specification of each subroutine of the one or more subroutines into a single bundle file;
deploying the definition and the SQL call specification of each subroutine of the one or more subroutines into a database management system (DBMS) from the single bundle file;
invoking the SQL call specification of at least one subroutine of the one or more subroutines to execute the definition of the subroutine in the DBMS;
wherein the method is performed by one or more computers.

2. The method of claim 1 wherein said generating comprises obtaining said one or more subroutines from a plurality of modules of said scripting language.

3. The method of claim 1 wherein said deploying comprises said generating and said packaging.

4. The method of claim 1 wherein said SQL call specification declares parameter types of said subroutine.

5. The method of claim 4 wherein said generating comprises obtaining said parameter types from said signature declaration.

6. The method of claim 1 wherein said generating comprises generating data definition language (DDL) that contains said SQL call specification.

7. The method of claim 1 wherein said SQL call specification comprises an annotation that maps a type from said scripting language to a type in SQL for at least one element of said subroutine selected from the group consisting of: a parameter, and a return value.

8. The method of claim 1 wherein said SQL call specification contains an output parameter.

9. The method of claim 8 wherein:
said signature declaration of said particular subroutine comprises a result value that comprises said structure;
said structure comprises a field that maps to said output parameter.

10. The method of claim 1 wherein said SQL call specification comprises a same parameter that is both of an input parameter and an output parameter.

11. The method of claim 10 wherein:
said structure comprises a particular field that maps to said same parameter;
said signature declaration of said particular subroutine comprises:
a result value that comprises said structure, and
a parameter having a same name as said particular field.

12. One or more non-transitory computer-readable media storing instructions that, when executed by one or more computers, cause:
generating a structured query language (SQL) call specification for each subroutine of one or more subroutines encoded in a scripting language, including a particular SQL call specification for a particular subroutine of the one or more subroutines, wherein:
said generating is based on a signature declaration of the subroutine,
each subroutine of the one or more subroutines comprises a definition of one selected from the group consisting of: a stored procedure and a user-defined function,
said particular subroutine returns a structure that contains a plurality of fields, and
said particular SQL call specification contains each field of the plurality of fields as a respective parameter;
packaging the definition and the SQL call specification of each subroutine of the one or more subroutines into a single bundle file;
deploying the definition and the SQL call specification of each subroutine of the one or more subroutines into a database management system (DBMS) from the single bundle file;
invoking the SQL call specification of at least one subroutine of the one or more subroutines to execute the definition of the subroutine in the DBMS.

13. The one or more non-transitory computer-readable media of claim 12 wherein said generating comprises obtaining said one or more subroutines from a plurality of modules of said scripting language.

14. The one or more non-transitory computer-readable media of claim 12 wherein said deploying comprises said generating and said packaging.

15. The one or more non-transitory computer-readable media of claim 12 wherein said SQL call specification declares parameter types of said subroutine.

16. The one or more non-transitory computer-readable media of claim 15 wherein said generating comprises obtaining said parameter types from said signature declaration.

17. The one or more non-transitory computer-readable media of claim 12 wherein said generating comprises generating data definition language (DDL) that contains said SQL call specification.

18. The one or more non-transitory computer-readable media of claim 12 wherein said SQL call specification comprises an annotation that maps a type from said scripting language to a type in SQL for at least one element of said subroutine selected from the group consisting of: a parameter, and a return value.

19. The one or more non-transitory computer-readable media of claim 12 wherein said SQL call specification contains an output parameter.

20. The one or more non-transitory computer-readable media of claim 12 wherein said SQL call specification comprises a same parameter that is both of an input parameter and an output parameter.

* * * * *